US012606288B1

(12) United States Patent
Amerling et al.

(10) Patent No.: US 12,606,288 B1
(45) Date of Patent: Apr. 21, 2026

(54) MARINE DRIVE COWLINGS HAVING ACCESS LID WITH HINGE DEVICE

(71) Applicant: Brunswick Corporation, Mettawa, IL (US)

(72) Inventors: Steven J. Amerling, Fond du Lac, WI (US); Kurt Pflanz, Slinger, WI (US); Rick R. Roth, Oakfield, WI (US)

(73) Assignee: Brunswick Corporation, Mettawa, IL (US)

( * ) Notice: Subject to any disclaimer, the term of this patent is extended or adjusted under 35 U.S.C. 154(b) by 404 days.

(21) Appl. No.: 18/197,436

(22) Filed: May 15, 2023

Related U.S. Application Data

(60) Provisional application No. 63/424,710, filed on Nov. 11, 2022.

(51) Int. Cl.
*B63H 20/32* (2006.01)
*E05C 3/14* (2006.01)

(52) U.S. Cl.
CPC ................ *B63H 20/32* (2013.01); *E05C 3/14* (2013.01)

(58) Field of Classification Search
CPC ................................. B63H 20/32; E05C 3/14
See application file for complete search history.

(56) References Cited

U.S. PATENT DOCUMENTS

| | | | |
|---|---|---|---|
| 3,315,631 A | 4/1967 | Bass | |
| 3,598,273 A | 8/1971 | Rau | |
| 4,066,032 A | 1/1978 | Travis | |
| 4,090,273 A * | 5/1978 | Hurst, Jr. | E05D 11/1071 16/334 |
| 5,487,687 A | 1/1996 | Idzikowski | |
| 5,662,213 A | 9/1997 | Kattler | |
| 6,630,637 B1 * | 10/2003 | Ward | H01H 9/02 200/17 R |
| 6,669,517 B1 * | 12/2003 | Alby | F02B 61/045 123/195 P |
| 7,249,984 B2 | 7/2007 | Kobayashi | |
| 7,267,592 B1 | 9/2007 | Ingebritson et al. | |

(Continued)

FOREIGN PATENT DOCUMENTS

| | | | |
|---|---|---|---|
| DE | 102017105904 A1 | 9/2017 | |
| EP | 4219290 A1 | 8/2023 | |

(Continued)

OTHER PUBLICATIONS

Unpublished U.S. Appl. No. 16/171,490, filed Oct. 26, 2018.

(Continued)

*Primary Examiner* — Stephen P Avila
(74) *Attorney, Agent, or Firm* — Andrus Intellectual Property Law, LLP

(57) ABSTRACT

A cowling for a marine drive has a first cowl portion and a second cowl portion which together define a cowling interior, a hinge device that pivotably couples the first cowl portion and second cowl portion together, the hinge device comprising a hinge bracket and a base bracket, the hinge bracket being configured so that first cowl portion is pivotable relative to the second cowl portion about the hinge axis into and between an open cowl position exposing the cowling interior and a closed cowl position enclosing the cowling interior; and a detent mechanism which retains the first cowl portion in the open cowl position.

20 Claims, 12 Drawing Sheets

(56) References Cited

U.S. PATENT DOCUMENTS

| | | | |
|---|---|---|---|
| 8,337,264 | B2 | 12/2012 | Boebel |
| 9,017,121 | B1 | 4/2015 | Amerling |
| 9,180,950 | B1 | 11/2015 | Davenport |
| 9,216,805 | B1 | 12/2015 | Amerling et al. |
| 9,341,008 | B1 | 5/2016 | Amerling et al. |
| 9,365,277 | B2 | 6/2016 | Skrzypchak |
| 9,580,943 | B1 | 2/2017 | Amerling et al. |
| 9,580,947 | B1 | 2/2017 | Amerling et al. |
| 9,701,383 | B1 | 7/2017 | Stuber |
| 9,926,064 | B1 | 3/2018 | Tuchscherer |
| 9,963,213 | B1 | 5/2018 | Jaszewski |
| 10,005,534 | B1 | 6/2018 | Amerling et al. |
| 10,150,549 | B1 | 12/2018 | Amerling et al. |
| 10,161,168 | B1 | 12/2018 | VanRuiswyk et al. |
| 10,202,180 | B1 | 2/2019 | Amerling et al. |
| 10,286,989 | B1 | 5/2019 | Amerling et al. |
| 10,287,963 | B2 | 5/2019 | Tsuno |
| 10,336,429 | B1 | 7/2019 | Amerling et al. |
| 10,351,222 | B1 | 7/2019 | Amerling et al. |
| 10,464,648 | B1 | 11/2019 | Amerling et al. |
| 10,710,691 | B2 | 7/2020 | Amerling et al. |
| 10,718,142 | B1 | 7/2020 | Amerling et al. |
| 11,046,409 | B2 | 6/2021 | Wiegele |
| 11,066,140 | B1 | 7/2021 | Huffer |
| 11,130,555 | B1 | 9/2021 | Foulkes et al. |
| 11,183,739 | B2 | 11/2021 | Milroy |
| 11,312,462 | B1 | 4/2022 | Faust et al. |
| 11,352,116 | B1 | 6/2022 | Amerling et al. |
| 11,542,735 | B1 | 1/2023 | Amerling et al. |
| 11,577,809 | B1 | 2/2023 | Faust et al. |
| 11,781,701 | B2 | 10/2023 | Kimpara |
| 11,820,479 | B2 | 11/2023 | Kimpara |
| D1,018,424 | S | 3/2024 | Norton |
| 12,134,450 | B2 | 11/2024 | Sawyer |
| 12,162,579 | B1 | 12/2024 | Schrank |
| 12,179,899 | B2 | 12/2024 | Jaszewski |
| 12,214,852 | B2 | 2/2025 | Dannenberg |
| 12,377,947 | B2 | 8/2025 | Fergus |
| 2011/0244740 | A1 | 10/2011 | Daikoku |
| 2012/0064783 | A1 | 3/2012 | Grez |
| 2016/0047147 | A1 * | 2/2016 | James ................. E05D 11/1071 292/194 |
| 2018/0362131 | A1 | 12/2018 | He |
| 2019/0118921 | A1 | 4/2019 | Drapeau |
| 2019/0148700 | A1 | 5/2019 | Milroy |
| 2021/0143710 | A1 | 5/2021 | Sprague |
| 2022/0089261 | A1 | 3/2022 | Bruestle |
| 2023/0087983 | A1 | 3/2023 | Kimpara |
| 2023/0102741 | A1 | 3/2023 | Fergus |
| 2024/0270365 | A1 | 8/2024 | Podell |

FOREIGN PATENT DOCUMENTS

| | | | |
|---|---|---|---|
| JP | 2005153727 | A | 6/2005 |
| JP | 2005162054 | A | 6/2005 |
| JP | 2005162055 | A | 6/2005 |
| JP | 2013252736 | A | 12/2013 |

OTHER PUBLICATIONS

Unpublished U.S. Appl. No. 16/986,669, filed Aug. 6, 2020.
Unpublished U.S. Appl. No. 16/986,938, filed Aug. 6, 2020.
Unpublished U.S. Appl. No. 17/068,536, filed Oct. 12, 2020.
Unpublished U.S. Appl. No. 17/171,600, filed Feb. 9, 2021.
Unpublished U.S. Appl. No. 17/585,285, filed Jan. 26, 2022.
Unpublished U.S. Appl. No. 17/701,022, filed Mar. 22, 2022.
Unpublished U.S. Appl. No. 18/092,782, filed Jan. 3, 2023.

* cited by examiner

MARINE DRIVE COWLINGS HAVING ACCESS LID WITH HINGE DEVICE

CROSS-REFERENCE TO RELATED APPLICATION

The present application is based on and claims priority to U.S. Provisional patent application No. 63/424,710 filed Nov. 11, 2022. The aforementioned provisional patent application is hereby incorporated herein by reference in entirety.

FIELD

The present disclosure relates to marine drives having an access lid with a hinge device and to hinge devices for cowlings on marine drives.

BACKGROUND

The following U.S. Patents are incorporated herein by reference in entirety.

U.S. Pat. No. 6,669,517 discloses a cowl structure having first and second cowl members that are independent components. A first cowl member is attachable, by a latch mechanism, to a support structure of the outboard motor. The second cowl member is attachable by a latch mechanism, to both the first cowl member and the support structure. The first cowl member extends across a rear portion of the outboard motor and at least partially along both port and starboard sides of the outboard motor. The second cowl member extends across a front portion of the outboard motor and at least partially along the port and starboard sides of the outboard motor. In a preferred example, the second cowl member also extends partially over a top portion of the outboard motor and over a rear portion of the outboard motor.

U.S. Pat. No. 9,341,008 discloses a hinge assembly for a cowl of an outboard motor. The hinge assembly is configured to connect a first portion of the cowl to a second portion of the cowl. The hinge assembly comprises an arm that is connected to one of the first and second cowl portions and a retainer that is connected to the other of the first and second cowl portions. The arm is movable with respect to the retainer between a registered position wherein the arm is retained by and pivotable with respect to the retainer to thereby pivotably connect the first portion of the cowl to the second portion of the cowl and an unregistered position wherein the arm is separated from the retainer so that the first portion of the cowl is separated from the second portion of the cowl.

U.S. Pat. No. 9,580,947 discloses a cowl for an outboard marine propulsion device having an internal combustion engine. The cowl comprises a first cowl portion; a second cowl portion that mates with the first cowl portion to enclose the internal combustion engine; a service door on the second cowl portion, wherein the service door is position-able in an open position and in a closed position; and a carrying handle on the second cowl portion, wherein the carrying handle is accessible when the service door is in the open position and inaccessible when the service door is in the closed position. A plurality of latches is spaced apart around the perimeter. The latches latch the second cowl portion to the first cowl portion. An actuator assembly actuates each of the plurality of latches. The actuator assembly can be actuated by movement of the carrying handle.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

In non-limiting examples disclosed herein, a cowling is for a marine drive, the cowling having a first cowl portion and a second cowl portion which together define a cowling interior. A hinge device pivotably couples the first cowl portion and second cowl portion together, the hinge device having a hinge bracket on the first cowl portion and a base bracket on the second cowl portion. The hinge bracket is configured so that first cowl portion is pivotable relative to the second cowl portion about the hinge axis into and between an open cowl position exposing the cowling interior and a closed cowl position enclosing the cowling interior. A detent mechanism may retain the first cowl portion in the open cowl position.

In non-limiting embodiments, the detent mechanism retains the first cowl portion in at least one of the open cowl position. Optionally the detent mechanism comprises a roller being configured to engage a saddle to retain the first cowl portion in the open cowl position. Optionally a latch device is provided which latches the first cowl portion to the second cowl portion, the latch device being movable into a latched position retaining the first cowl portion in the closed cowl position and an unlatched position permitting pivoting of the first cowl portion out of the closed cowl position. Optionally a pop-up device is provided which pushes the first cowl portion out of the closed cowl position into a pop-up position when the latch device is unlatched, the pop-up position permitting the first cowl portion to be manually moved into the open cowl position. In non-limiting embodiments the pop-up device may comprise a spring having a spring strength which is strong enough to overcome the weight of the first cowl portion.

In non-limiting embodiments, the detent mechanism comprises a pivot bracket which is pivotable relative to the base bracket about a pivot axis into and between an open bracket position and a closed bracket position. The pivot bracket may be spring biased into the closed bracket position, for example the detent mechanism may comprise a spring which applies the spring bias.

Optionally the detent mechanism comprises a roller on a first one of the hinge bracket and the pivot bracket and a saddle on a different second one of the hinge bracket and the pivot bracket, the roller being configured to engage the saddle to retain the first cowl portion in a first one of the open cowl position. In non-limiting examples, the saddle is part of an elongated shoulder configured so that pivoting of the first cowl portion towards the open cowl position causes the roller to engage and ride along the shoulder and then into the saddle once the first cowl portion reaches the open cowl position. Optionally the roller is on the hinge bracket and the saddle is on the pivot bracket. The base bracket may comprise a stop surface which engages with a corresponding stop surface on the hinge bracket to prevent overstroke of the hinge bracket as the first cowl portion is pivoted into the open cowl position. The stop surface on the base bracket may comprise an angled flange and the stop surface on the hinge bracket may comprise a cutout formed in a side of the hinge bracket. Optionally the hinge bracket is disposed axially between the base bracket and the pivot bracket relative to the hinge axis. The pivot bracket may comprise a turned out flange, wherein pivoting the first cowl portion into the open cowl position pivots the hinge bracket past the turned out surface, and wherein the turned out flange is configured to funnel the hinge bracket into position between the base bracket and the pivot bracket when the first cowl portion is pivoted from the open cowl position towards the closed cowl position.

In non-limiting examples, a hinge device is for a cowling of a marine drive, the cowling including a first cowl portion and a second cowl portion. The hinge device comprises a hinge bracket; a base bracket, wherein the hinge bracket and base bracket are configured so that the first cowl portion is pivotable relative to the second cowl portion about a hinge axis into and between an open cowl position exposing a cowling interior and a closed cowl position enclosing the cowling interior; and a detent mechanism which retains the first cowl portion in the open cowl position. The detent mechanism may comprise a pivot bracket which is pivotable relative to the base bracket about a pivot axis into and between an open bracket position and a closed bracket position, the pivot bracket being spring biased towards the closed bracket position; and a roller on a first one of the hinge bracket and the pivot bracket and a saddle on a different second one of the hinge bracket and the pivot bracket, the roller being configured to engage the saddle to retain the first cowl portion in the open cowl position.

In non-limiting examples, the saddle is part of an elongated shoulder configured so that pivoting of the first cowl portion towards the open cowl position causes the roller to engage and ride along the shoulder and then into the saddle once the first cowl portion reaches the open cowl position. The hinge bracket may be disposed between the base bracket and the pivot bracket relative to the hinge axis. The pivot bracket may comprise a turned out flange, wherein pivoting the first cowl portion into the open cowl position pivots the hinge bracket past the turned out surface, and wherein the turned out surface is configured to funnel the hinge bracket into position between the base bracket and the pivot bracket when the first cowl portion is pivoted from the open cowl position towards the closed cowl position.

BRIEF DESCRIPTION OF THE DRAWINGS

Examples are described with reference to the following drawing figures. The same numbers are used throughout to reference like features and components.

DETAILED DESCRIPTION OF THE DRAWINGS

Figure 1:
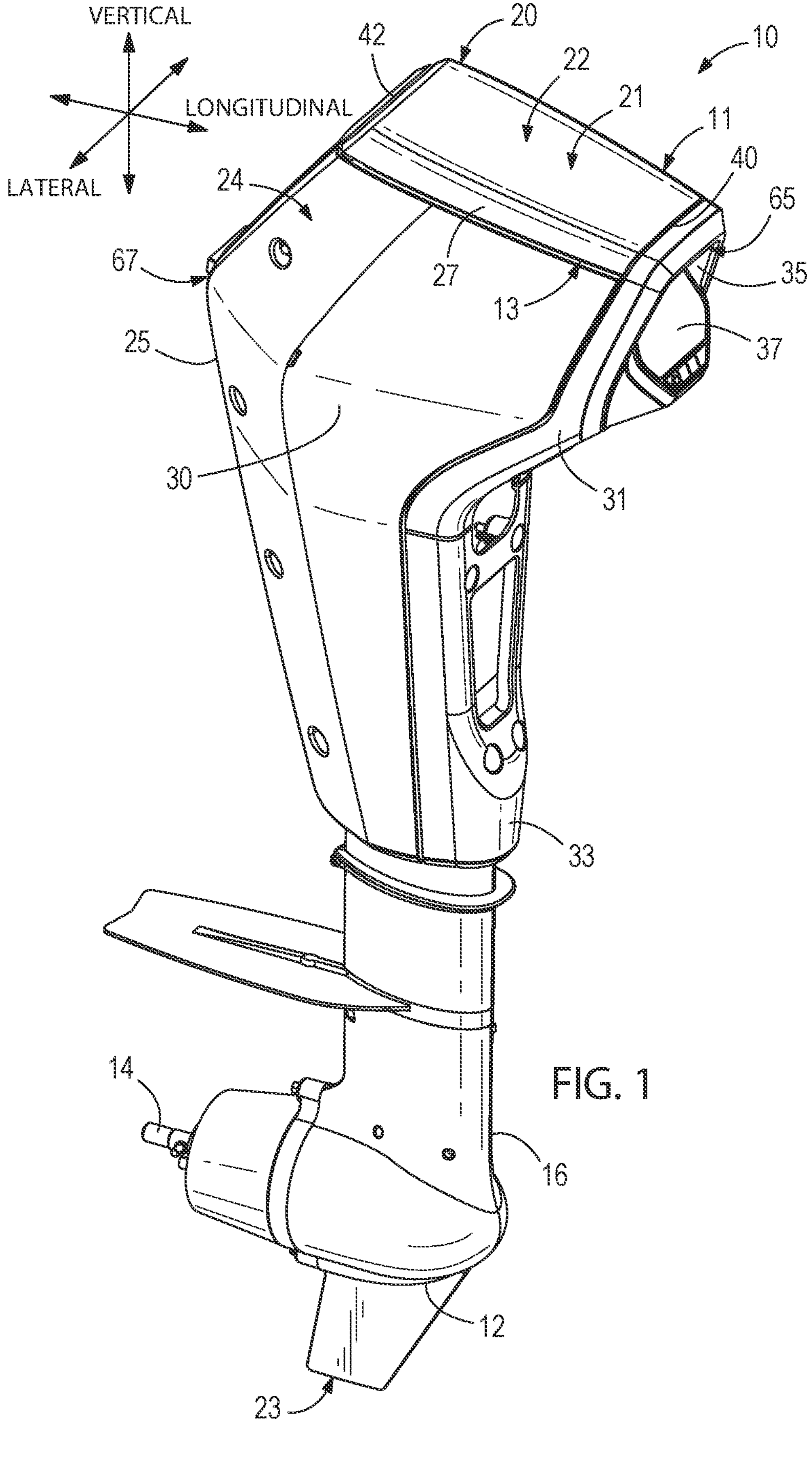
FIG. 1 is a starboard side perspective view of a marine drive according to the present disclosure.

FIG. 1 depicts an exemplary marine drive 10 according to the present disclosure, which in the illustrated example is an outboard motor. The marine drive 10 extends from front 65 to rear 67 in a longitudinal direction, from a port side 11 to a starboard side 13 in a lateral direction which is perpendicular to the longitudinal direction, and from top 21 to bottom 23 in a vertical direction which is perpendicular to the longitudinal direction and perpendicular to the lateral direction. The marine drive 10 is configured to generate a thrust force in water via a propulsor. The type and configuration of the propulsor is not shown and can widely vary, and for example can one or more propellers, one or more impellers, and/or the like. In the shown example, the propulsor is mounted on a propulsor shaft 14, which extends from the rear housing 12 of a lower unit 16 of the marine drive 10. This is not limiting however, and in other examples the propulsor may be located on the front of the lower unit 16 in a pulling- or tractor-type arrangement. In use, the lower unit 16 remains stationary relative to the rest of the marine drive 10, however in other examples the lower unit 16 and the propulsor could be steerable relative to the rest of the marine drive 10, for example about a vertical steering axis. Other configurations are contemplated and are possible within the scope of the present disclosure.

Although not shown, the marine drive 10 has an electric motor which is configured to cause rotation of the propulsor shaft 14 and the corresponding propulsor. The type, location and configuration of the electric motor can vary, and non-limiting examples includes an axial flux motor, a radial flux motor, or a transverse flux motor, such as those produced by Electric Torque Machines of Flagstaff, Arizona (a Graco Company). The marine drive 10 may also have one or more batteries, which provides battery power to the electric motor. The type, configuration and location of the one or more batteries can vary. For example the one or more batteries may be located in the marine drive 10 and/or located in the marine vessel. The present disclosure is also not limited for use with marine drives having electric motors and for example is equally applicable to embodiments having an internal combustion engine or any other source of power for the propulsor.

Figure 3:
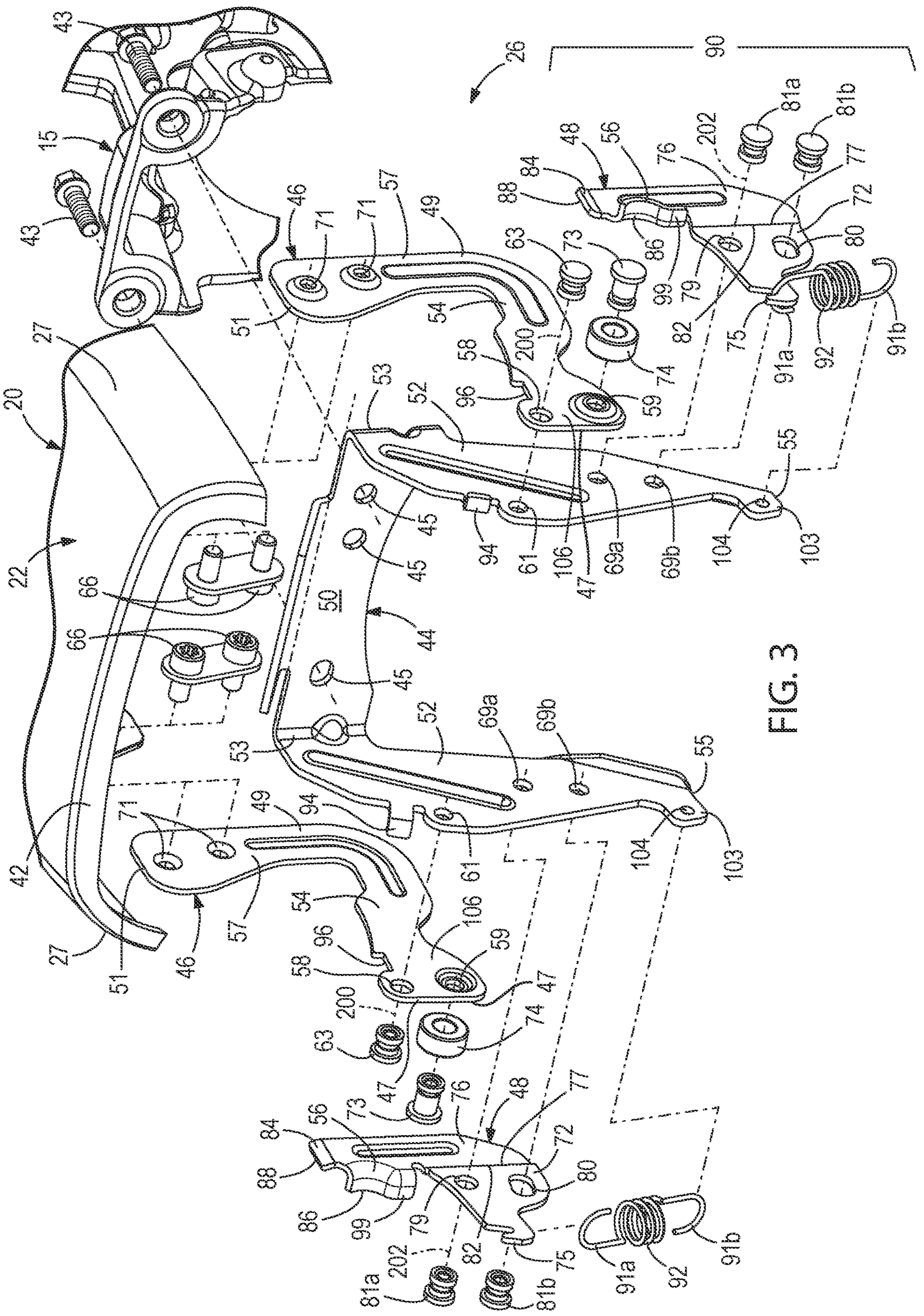
FIG. 3 is an exploded view of the hinge device illustrating a hinge bracket, a base bracket, and a pivot bracket with the first cowl portion.
Figure 4:
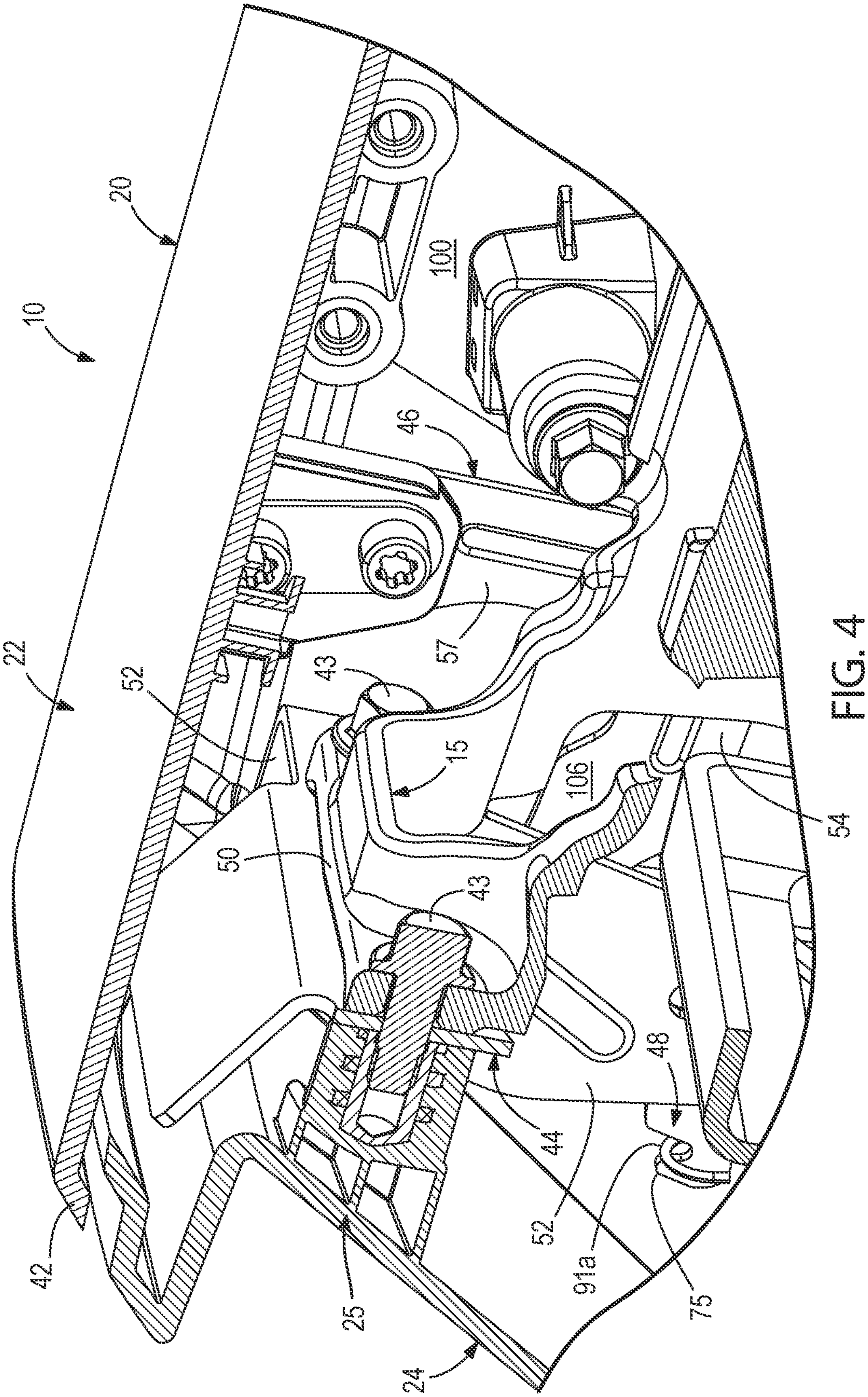
FIG. 4 is a view of section 4-4, taken in FIG. 2, illustrating the first cowl portion in a closed cowl position.

Briefly referring to FIGS. 3-4, the marine drive 10 also has an internal supporting frame 15 for structurally supporting various internal and external components of the marine drive 10 and for structurally supporting the entire marine drive 10 relative to the marine vessel. The type and configuration of the supporting frame 15 can widely vary. Reference is made to the above-incorporated U.S. patents, which teach various marine drives having supporting frames which are suitable for use with the present disclosure.

Figure 2:
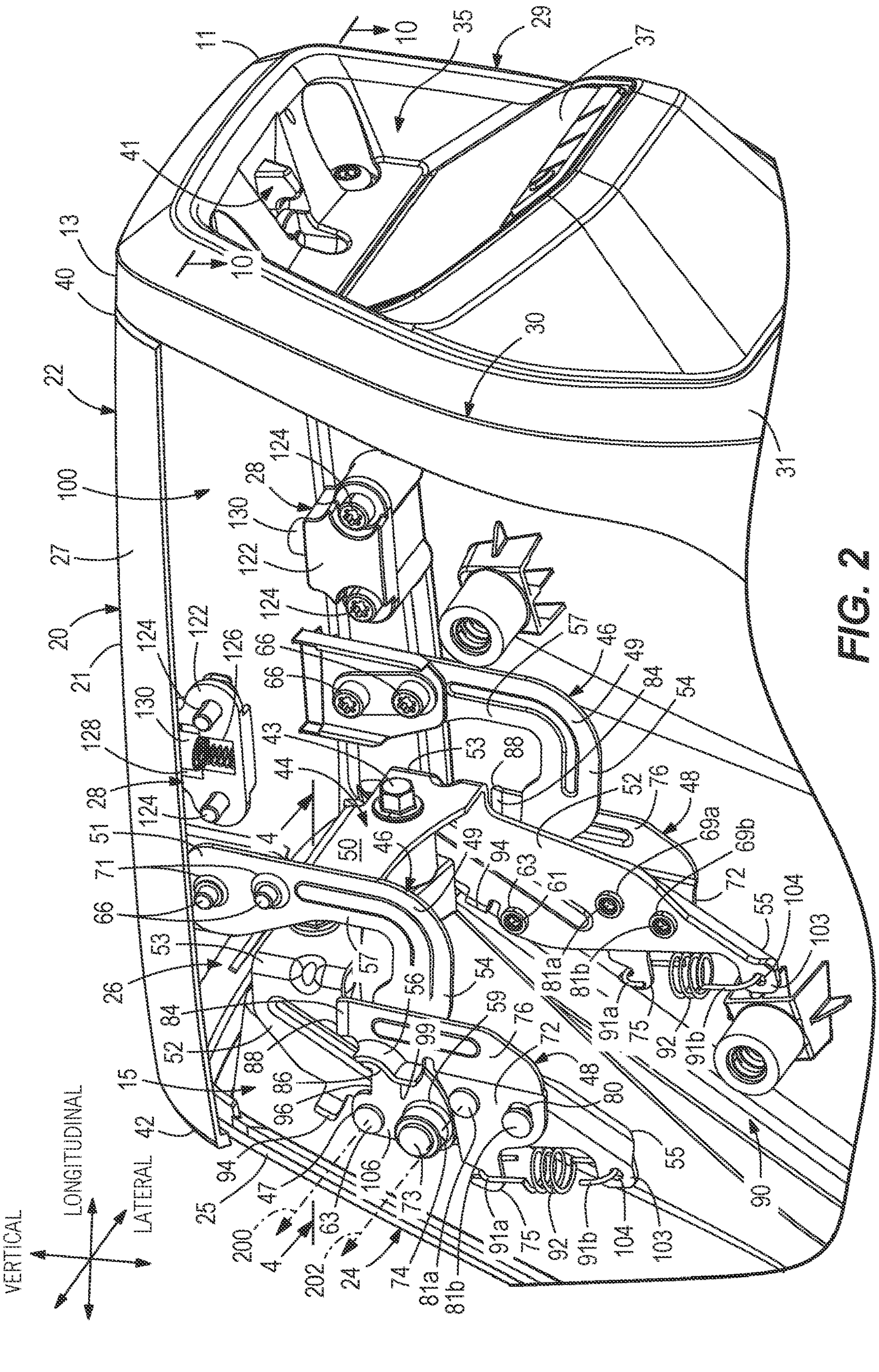
FIG. 2 is a partial view of an interior of a cowling of the marine drive illustrating a hinge device for pivotably coupling a first cowl portion to a second cowl portion.

Now referring to FIGS. 1-3, the marine drive 10 also has a cowling 20 which is mounted on the supporting frame 15. The type and configuration of the cowling 20 can widely vary and additional examples which are suitable for use with the present disclosure are taught in the above-referenced U.S. patents. In the illustrated example, the cowling 20 generally includes a first cowl portion 22 (e.g., a lid 22) and a second cowl portion 24 (e.g., a cowl body 24). Together the lid 22 and the cowl body 24 define a cowling interior 100 containing the supporting frame 15 and various other components including optionally the one or more batteries.

As will be further described herein below, the marine drive 10 includes a novel combination of a hinge device 26, a latch device 41, and a pair of pop-up devices 28. These items together advantageously facilitate an efficient and effective pivotable connection of the lid 22 to the cowl body 24 so that the lid 22 is easily movable into and between a closed cowl position (e.g., FIGS. 1, 5) enclosing the cowl interior 100 and an open cowl position (e.g., FIGS. 7-9) providing access thereto.

The cowl body 24 has several cowl panels, including port and starboard side cowl panels 29, 30, a rear cowl panel 25, an upper front cowl panel 31, and a lower front cowl panel 33. Again, this disclosure is not limited for use with such an arrangement, and in some examples the cowl body 24 may have more or less panels. A window 35 is defined in the upper front cowl panel 31 and provides the user with access to a screen device 37, which is for displaying operational characteristics of the marine drive 10. Generally, the lid 22 includes a trapezoidal plate having downwardly turned side edges 27 which overlap the upper edges of the port and starboard side cowl panels 29, 30 when the lid 22 is in the closed cowl position. The lid 22 has a front end 40 which is latched to the cowl body 24 by the latch device 41 and a rear end 42 which is pivotally coupled to the cowl body 24 by the hinge device 26, which is a subject of the present disclosure and further described herein below. The pop-up devices 28 are positioned at a middle portion along each of the port and starboard side cowl panels 29, 30 and operably engage with a perimeter of the lid 22, all as will be further described herein below.

Referring to FIGS. 2-4, the hinge device 26 is located in the cowling interior 100 and is configured so that the lid 22 is pivotable relative to the cowl body 24 about a laterally extending hinge axis 200. The hinge device 26 has a base bracket 44 and a hinge bracket 46. The base bracket 44 is fixedly coupled to the supporting frame 15 at an upper end of the cowl body 24, and the hinge bracket 46 is fixedly coupled to inside surfaces of the lid 22. The hinge device 26 also has a pivot bracket 48 which is pivotably coupled to the base bracket 44. The purpose and function of the pivot bracket 48 will be further described herein below. Relative to the hinge axis 200, the hinge bracket 46 is located axially between the base bracket 44 and the pivot bracket 48 (see FIG. 10). As will be described further herein, the hinge device 26 has a novel detent mechanism (noted generally at 90 in FIG. 3) which advantageously provides an improved means for operable engagement between the base bracket 44 and the hinge bracket 46 in particular to securely and removably retain the lid 22 in the open cowl position.

The starboard side of the hinge device 26 is essentially a mirror image of the port side of the hinge device 26. For conciseness and to avoid redundancy, the following description of the starboard side of the hinge device 26 equally applies to the port side of the hinge device 26.

Figure 10:
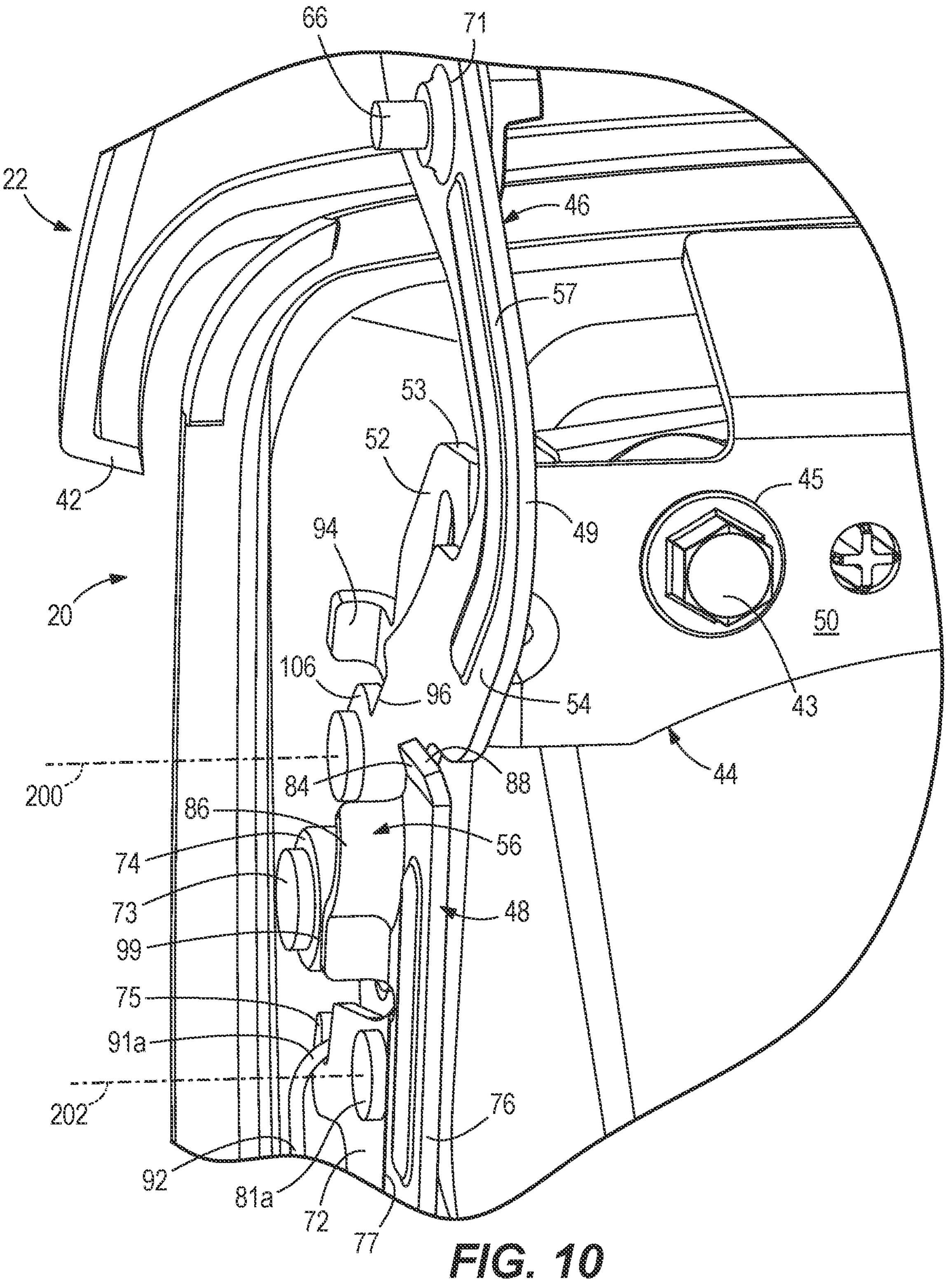
FIG. 10 is a partial view of the hinge device from inside the cowling.

Primarily referring to FIGS. 3, 4 and 10, the base bracket 44 has a crossbar 50 and a pair of support legs 52. The crossbar 50 extends vertically and laterally relative to the port and starboard cowl panels 29, 30. The support legs 52 are on laterally opposing ends of the crossbar 50 and extend vertically downward and longitudinally rearward toward the rear cowl panel 25. The crossbar 50 and support legs 52 generally form a U-shape which opens towards the rear cowl panel 25. The crossbar 50 is secured to the rear cowl panel 25 via fasteners 43 which extend through holes 45 in the crossbar 50 and into fixed engagement with the support frame 15, as shown in FIGS. 3 and 4.

Referring to FIG. 3, the support leg 52 has a first end 53 which is coupled to or integrally formed with the crossbar 50 and a second end 55 which as further described herein below is pivotably coupled to the pivot bracket 48. The second end 55 terminates at a foot 103 having an hole 104. First and second holes 69*a*, 69*b* are located vertically aligned along the middle portion of the support leg 52 and provide attachment points for the pivot bracket 48, as will be further described herein below. A hole 61 is provided in a middle portion of the support leg 52 for coupling to the hinge bracket 46 along the hinge axis 200, as will be further described herein below. The support leg 52 also has an angled flange 94, which is located above the hole 61. The angled flange 94 is bent laterally outwardly and vertically downwardly and provides a first stop surface for engagement with a corresponding second stop surface of the hinge bracket 46, as will be further described herein below.

With continued reference to FIG. 3, the hinge bracket 46 is a generally L-shaped plate member, having a base arm 54 and a support arm 57 which are formed together at an elbow 49. The hinge bracket 46 extends in the longitudinal and vertical directions and is pivotable relative to the base bracket 44 about the hinge axis 200. The base arm 54 has an attachment portion 106 at a first end 47, the attachment portion 106 having vertically-aligned first and second holes 58, 59. A cutout 96 is located adjacent the first end 47 and constitutes the second stop surface for engagement with the angled flange 94 of the base bracket 44. A fastener 63 extends through the first hole 58 in the hinge bracket 46 and the hole 61 in the base bracket 44 so as to pivotably couple the hinge bracket 46 to the base bracket 44 along the hinge axis 200. The support arm 57 extends generally upwardly from the elbow 49 to an upper end 51 having a pair of vertically aligned holes 71. Fasteners 66 extend through the holes 71 and into corresponding holes in the rear of the lid 22, thereby fixedly fastening the hinge bracket 46 to the lid 22. A roller 74 is coupled to the hinge bracket 46 by a rivet 73 extending through the roller 74 and into the second hole 59.

With continued reference to FIG. 3, the pivot bracket 48 is a generally L-shaped plate-like member extending in the longitudinal and vertical directions. The pivot bracket 48 has an engagement body 72 formed together with a saddle arm 76. The engagement body 72 has a hooked first end 75 and a second end 77 from which the saddle arm 76 extends. The engagement body 72 has a first hole 79 and an elongated second hole 80. A first rivet 81*a* extends through the first hole 79 and the hole 69*a* of the support leg 52, thus pivotably coupling the pivot bracket 48 to the base bracket 44 along a lateral pivot axis 202. A second rivet 81*b* extends through the elongated second hole 80 and the hole 69*b* of the support leg 52. The hooked first end 75 is coupled to the base bracket 44 via a coil spring 92. The coil spring 92 has vertically opposed first and second hooks 91*a*, 91*b*. The first hook 91*a* is engaged with the hooked end 75 of the engagement body 72 and the second hook 91*b* is engaged with the hole 104 of the support leg 52. The coil spring 92 has a natural bias wherein it tends to contract. The tendency of the coil spring 92 to contract causes it to pivot the pivot bracket 48 into a closed bracket position shown in FIGS. 5-7, which brings the rearwardmost end of the elongated second hole 80 into engagement with the second rivet 81*b*. As will be further described herein below, pivoting the lid 22 from the closed position shown in FIG. 5 into the open cowl position shown in FIG. 9 causes the pivot bracket 48 to pivot relative to the base bracket 44 about the lateral pivot axis 202 into an open bracket position, which moves the rearwardmost end of the elongated second hole 80 away from the second rivet 81*b* and brings the forwardmost end of the elongated second hole 80 towards second rivet 81*b*.

Referring to FIGS. 3 and 10, the saddle arm 76 has a first end 82 which is coupled to or formed with the engagement body 72 and an opposite, second end 88 which is coupled to or formed with the engagement body 72. The second end 88 has a turned out flange 84 which is angled laterally outwardly relative to the saddle arm 76.

Referring to FIG. 3, the saddle arm 76 also has an elongated shoulder 56 providing an engagement surface 99 which leads to a curved pocket or saddle 86. The elongated shoulder 56 generally faces the rear cowl panel 25 and is located along a middle portion of the saddle arm 76. As will be further described herein below, the elongated shoulder 56, including the engagement surface 99 and the saddle 86, is configured to be engaged by the roller 74 as the lid 22 is pivoted into the open cowl position, thus advantageously providing a detent functionality which securely and removably retains the lid 22 in the open cowl position. More generally, the detent mechanism 90 generally includes the pivot bracket 48, the coil spring 92 which applies the spring bias, and the roller 74 which engages with the shoulder 56 and saddle 86 to retain the lid 22 in the open cowl position (FIG. 9). In the shown example, the roller 74 is located on the hinge bracket 46 and the saddle 86 is located on the pivot bracket 48, however such a configuration is not limiting. In other examples, the roller 74 can be located on the pivot bracket 48 and the saddle 86 can be located on the hinge bracket 46. The functionality of the detent mechanism 90 will be further described herein below with reference to FIGS. 5-9 after the following detailed description of the latch device 41.

Initially, for the purposes of the present disclosure, it is important to realize that the type and configuration of the latch device 41 can vary from the example shown. The novel hinge device 26 disclosed herein is not limited for use with the illustrated marine drive 10 and is not limited for use with the illustrated latch device 41. Now referring to FIGS. 11-14, and particularly FIGS. 11-12, the exemplary latch device 41, includes a latch engagement arm 230, which in the shown example is a hook-shaped plate member that is fixed to the interior surface of the lid 22, at the front thereof by fasteners 232 fixed to a mounting flange 234 so that the latch engagement arm 230 protrudes downwardly from the interior surface of the lid 22. The latch device 41 also includes a latch retainer 236 mounted on the upper cowl panel 31, particularly along the top front portion thereof adjacent the window 35 in the upper cowl panel 31. As further described herein below, the latch device 41 is advantageously configured so that pivoting the lid 22 into the closed cowl position shown in FIG. 5 causes the latch retainer 236 to automatically retain the latch engagement arm 230 and thereby retain the lid 22 in the closed cowl position.

Figure 11:
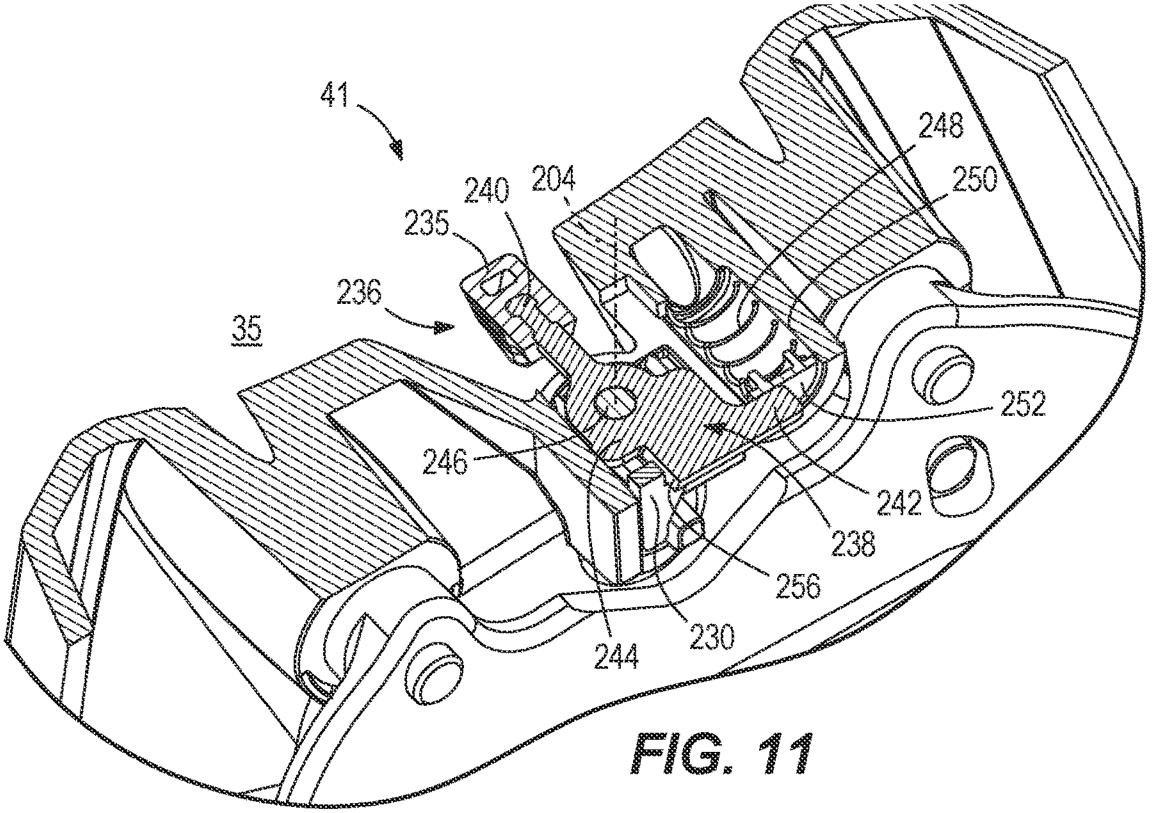
FIG. 11 is a view of section 10-10, taken in FIG. 2, illustrating a latch device in a latched position for closing a lid on the supporting frame, thereby enclosing the frame interior.
Figure 12:
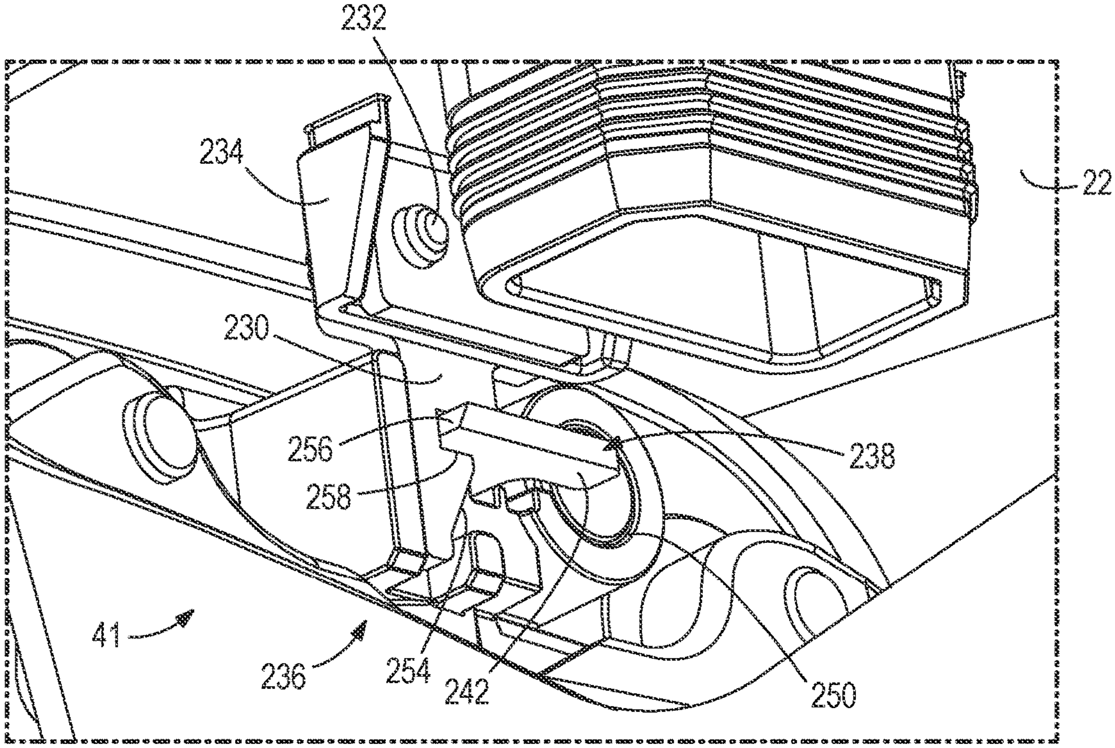
FIG. 12 is an interior perspective view of the lid latched to the supporting frame by the latch device.

With continued reference to FIGS. 11-12, the latch retainer 236 includes a latch lever 238, which is a generally L-shaped member having a first lever end 240 protruding outwardly from the cowling 20, particularly into the window 35 in the upper front cowl panel 31, above the screen device 37. A finger grip 235 is disposed on the first lever end 240, facilitating actuation of the latch lever 238. The latch lever 238 has an opposite, second lever end 242 which is located in the cowling interior 100 and extends transversely to the first lever end 240. A lever body 244 connects the first and second lever ends 240, 242. A pivot pin 246 axially extends through the lever body 244 and into engagement with the upper front cowl panel 31, alongside the upper front portion of the supporting frame 15 and defines a latch pivot axis 204. The latch lever 238 is pivotable about the latch pivot axis 204 and relative to the upper front cowl panel 31 and the upper front portion of the supporting frame 15. A compression spring 248 is contained in a spring cavity 250 formed in the upper front cowl panel 31. An end cap 252 retains the spring 248 in the spring cavity 250 and the bias of the spring 248 tends to move the end cap 252 outwardly to the outer end of the spring cavity 250. The second lever end 242 abuts the end cap 252, opposite the spring 248. As such, the spring 248 tends to pivot the latch lever 238 about the latch pivot axis 204 into the position shown in FIG. 11. As shown in FIG. 12, the latch engagement arm 230 has an angled engagement surface 254 and the latch lever 238, along the outside of the lever body 244, has a beveled engagement surface 256.

Figure 5:
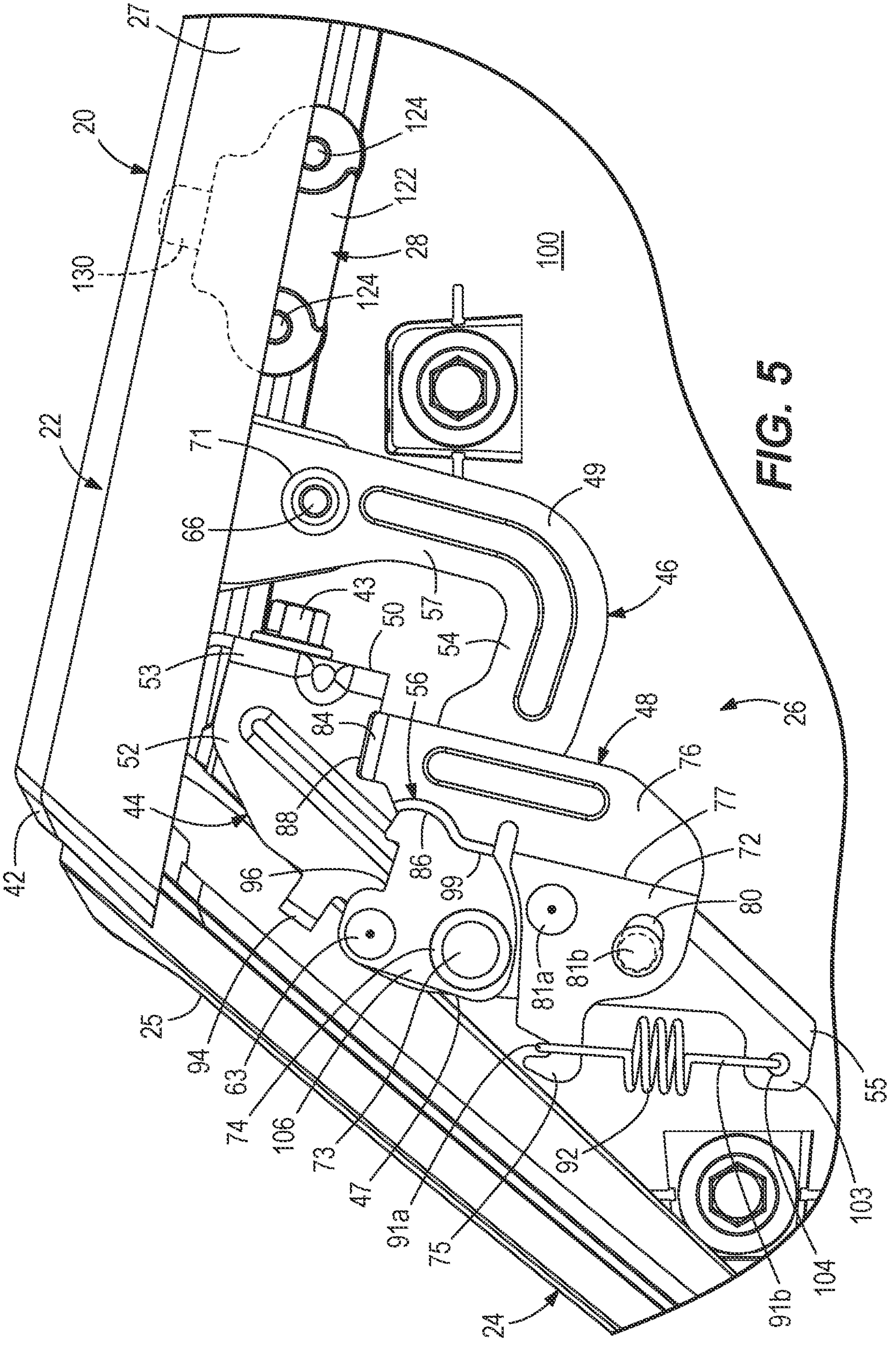
FIG. 5 is a partial interior view of the cowling illustrating the first cowl portion in the closed cowl position.
Figure 6:
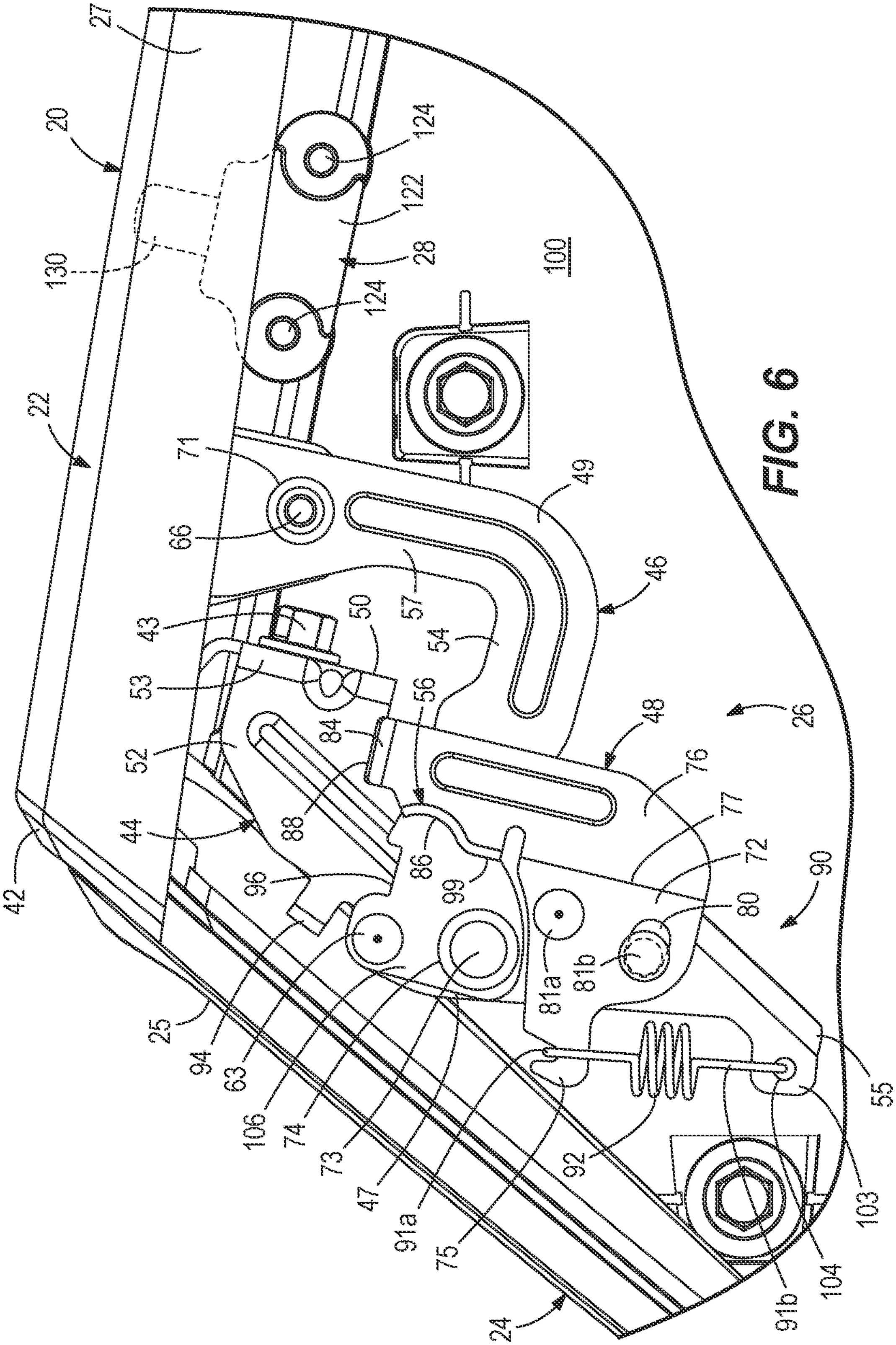
FIG. 6 is a partial interior view of the cowling illustrating the first cowl portion in a pop-up position.

Referring now to FIGS. 2, 4, and 5, the pop-up devices 28 are located alongside opposing upper edges of the port and starboard side cowl panels 29, 30 and are configured to automatically push/bias the lid 22 out of the closed cowl position shown in FIG. 5 into the pop-up position shown in FIG. 6, in which position it is possible for the user to lift up on the lid 22 from the underside of the lid 22, for example by pushing upwards on the underside of the lid 22 with their hand. The pop-up devices 28 are configured to abut the interior surface of the lid 22, alongside the downwardly turned side edges 27 when the lid 22 is in the closed cowl position (FIG. 5). Each pop-up device 28 has a spring retainer 122 which is fastened to one of the respective port and starboard side cowl panels 29, 30 by fasteners 124. The spring retainer 122 has an elongated spring cavity 126 which retains a compression spring 128. A scratch-resisting spring cap 130 is disposed on the outer end of the compression spring 128. The pop-up devices 28 are configured to push/bias the lid 22 out of the closed cowl position when the latch device 41 is unlatched. The compression spring 128 biases the lid 22 into a slightly opened position by tending to extend outwardly of the spring retainer 122. As will be further described herein below, the compression spring 128 has a spring strength which is strong enough to overcome the weight of the lid 22

FIGS. 5-9 viewed in sequence shows movement of the lid 22 from the closed cowl position to the open cowl position. In the closed cowl position shown in FIG. 5, the latch device 41 is in the latched position shown in FIGS. 11-12. To move the lid 22 out of the closed cowl position, the latch device 41 is temporarily moved out of the latched position shown in FIGS. 11-12 to the unlatched position shown in FIGS. 13-14, which frees the lid 22 for manually pivoting about the hinge axis 200, as further described herein below.

Beginning at FIG. 5, the cowling 20 is shown in the closed cowl position, wherein the latch device 41 is in the latched position (see FIGS. 11, 12). The hinge bracket 46 is positioned so that the roller 74 is not engaged with the elongated shoulder 56. The bias of the coil spring 92 retains the pivot bracket 48 in the closed bracket position so that the rearwardmost end of the elongated hole 80 is engaged with the rivet 81*b*.

Figure 13:
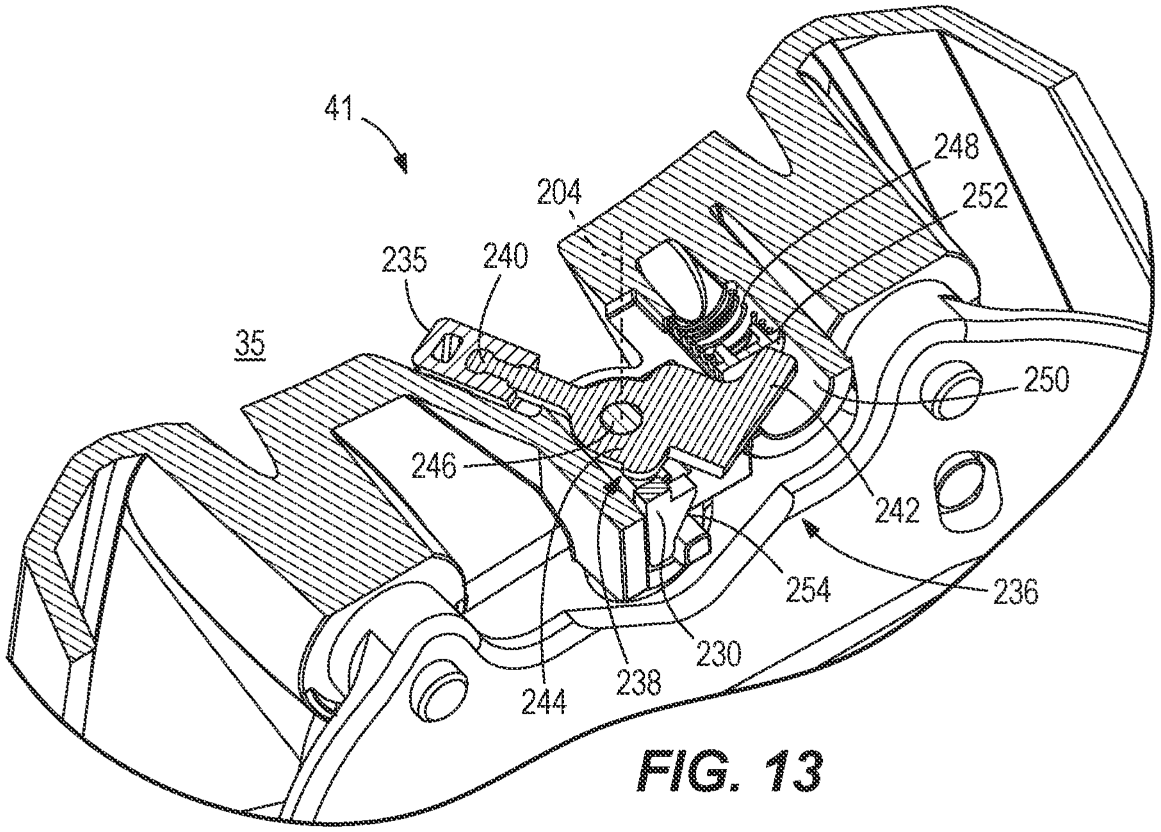
FIG. 13 is a view of section 10-10, taken in FIG. 2, illustrating the latch device in an unlatched position for opening the lid and exposing the frame interior.
Figure 14:
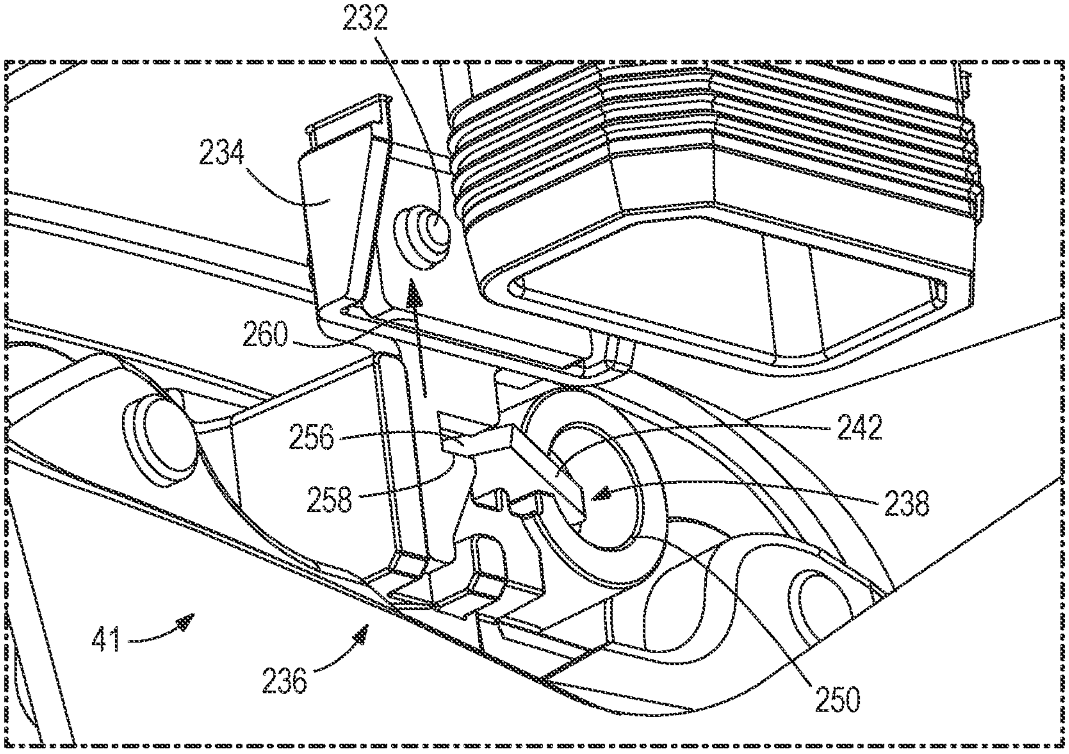
FIG. 14 is an interior perspective view of the lid unlatched from the supporting frame.

Referring to FIGS. 13-14, when it is desired to move the lid 22 out of the closed cowl position, the user engages the finger grip 235 of the latch device 41 and pivots the latch lever 238 counterclockwise when viewed from above into the position shown. This forces the end cap 252 further into the spring cavity 250, compressing the spring 248 and moving the lever body 244 out of the engagement recess 258 and thus out of engagement with the latch engagement arm 230, freeing the lid 22 for movement in the direction of arrow 260 in FIG. 14. Once the user releases the finger grip 235, the natural resiliency of the spring 248 pushes the end cap 252 back towards the outer end of the spring cavity 250 and pivots the latch lever 238 clockwise when viewed from above into the position shown in FIG. 11.

Now referring to FIG. 6, as the latch device 41 is moved into the unlatched position, the pop-up devices 28 are configured to push/bias the lid 22 out of the closed cowl position (FIG. 5). The compression spring 128 tends to expand, thus causing the spring cap 130 to push upwardly on the interior surface of the lid 22 and thereby pivot the lid 22 out of the closed cowl position (FIG. 5) into the pop-up position (FIG. 6). The compression spring 128 is strong enough to lift weight of the lid 22 (i.e., the first fowl portion 22) and any component(s) that coupled to the lid 22 so that said component(s) move with the lid 22 as the lid 22 moves into the cowl open position. For example, the compression spring 128 is strong enough to lift weight of the lid 22 and the hinge bracket 46. Thus, the hinge bracket 46 is caused to slightly pivot about the hinge axis 200. The roller 74 remains disengaged from the engagement surface 99 on the shoulder 56, and the pivot bracket 48 remains in the closed bracket position. The rivet 81*b* remains positioned at the rearward-most end of the elongated hole 80. In the pop-up position, the user can use their fingers to grasp the underside of the perimeter of the lid 22 and further pivot the lid 22 upwardly to the open cowl position, which movement is sequentially shown in FIGS. 7-9.

Figure 7:
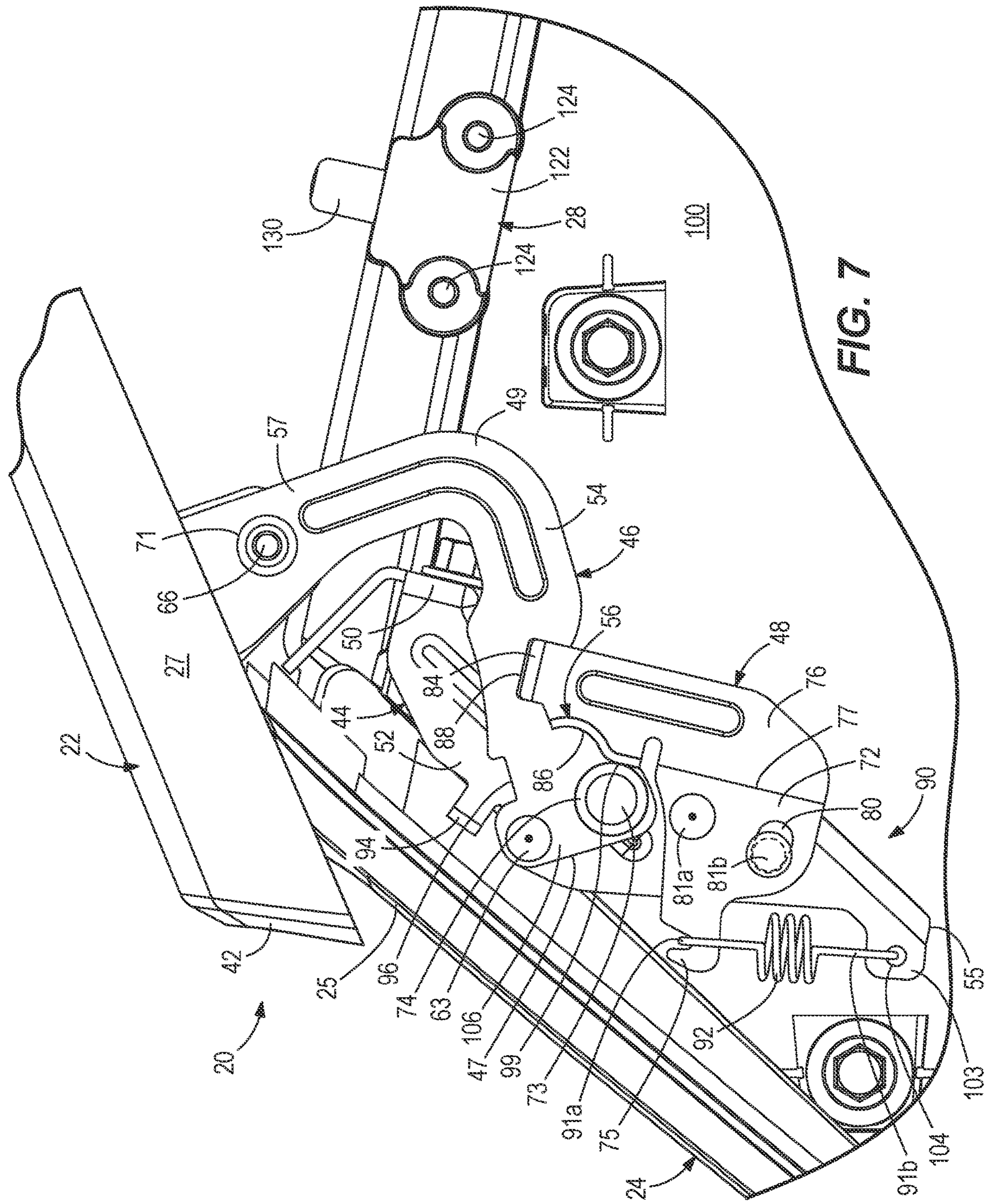
FIG. 7 is a partial interior view of the cowling illustrating the first cowl portion in a partially open cowl position.
Figure 8:
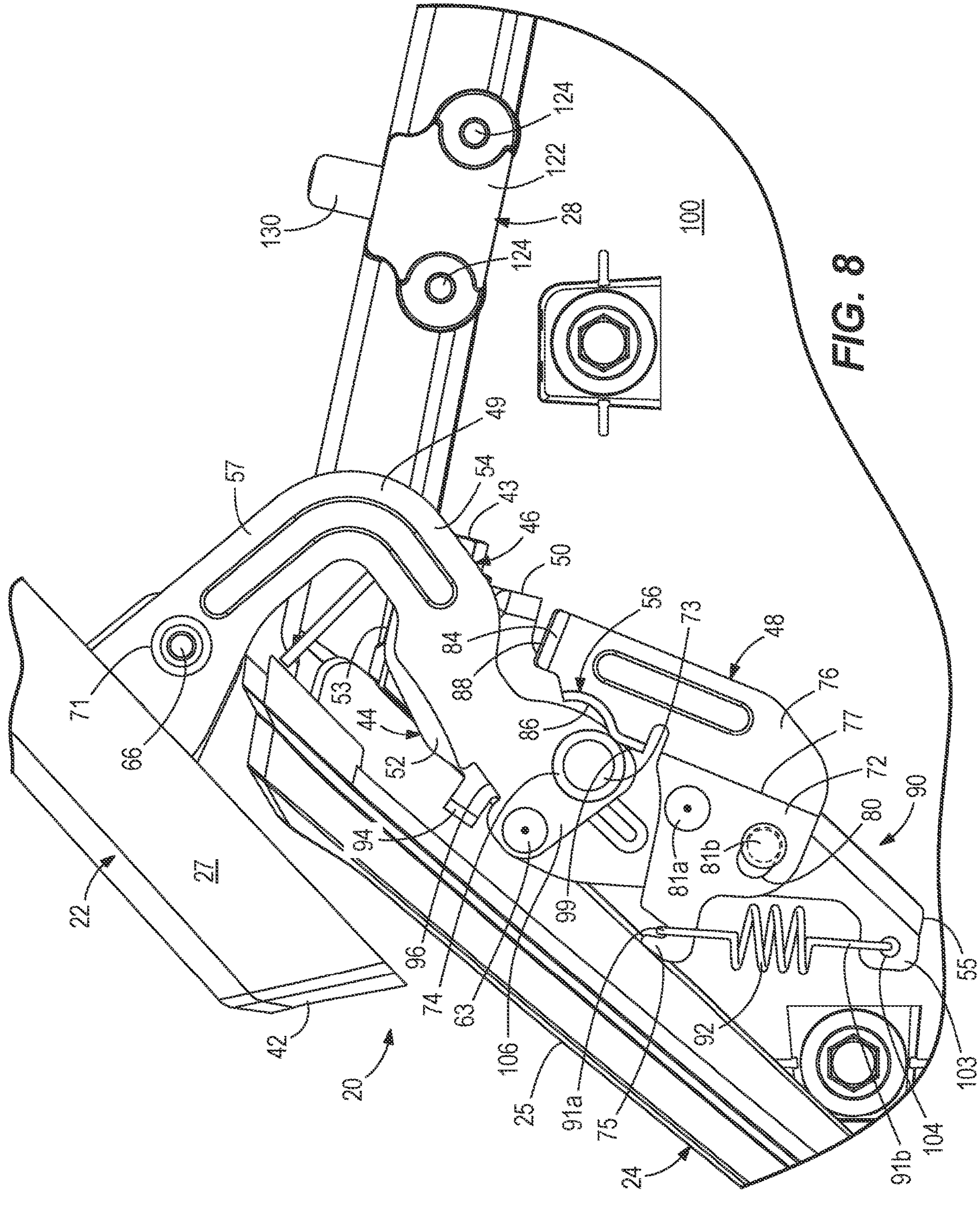
FIG. 8 is a partial interior view of the cowling illustrating the first cowl portion in a further partially open cowl position.
Figure 9:
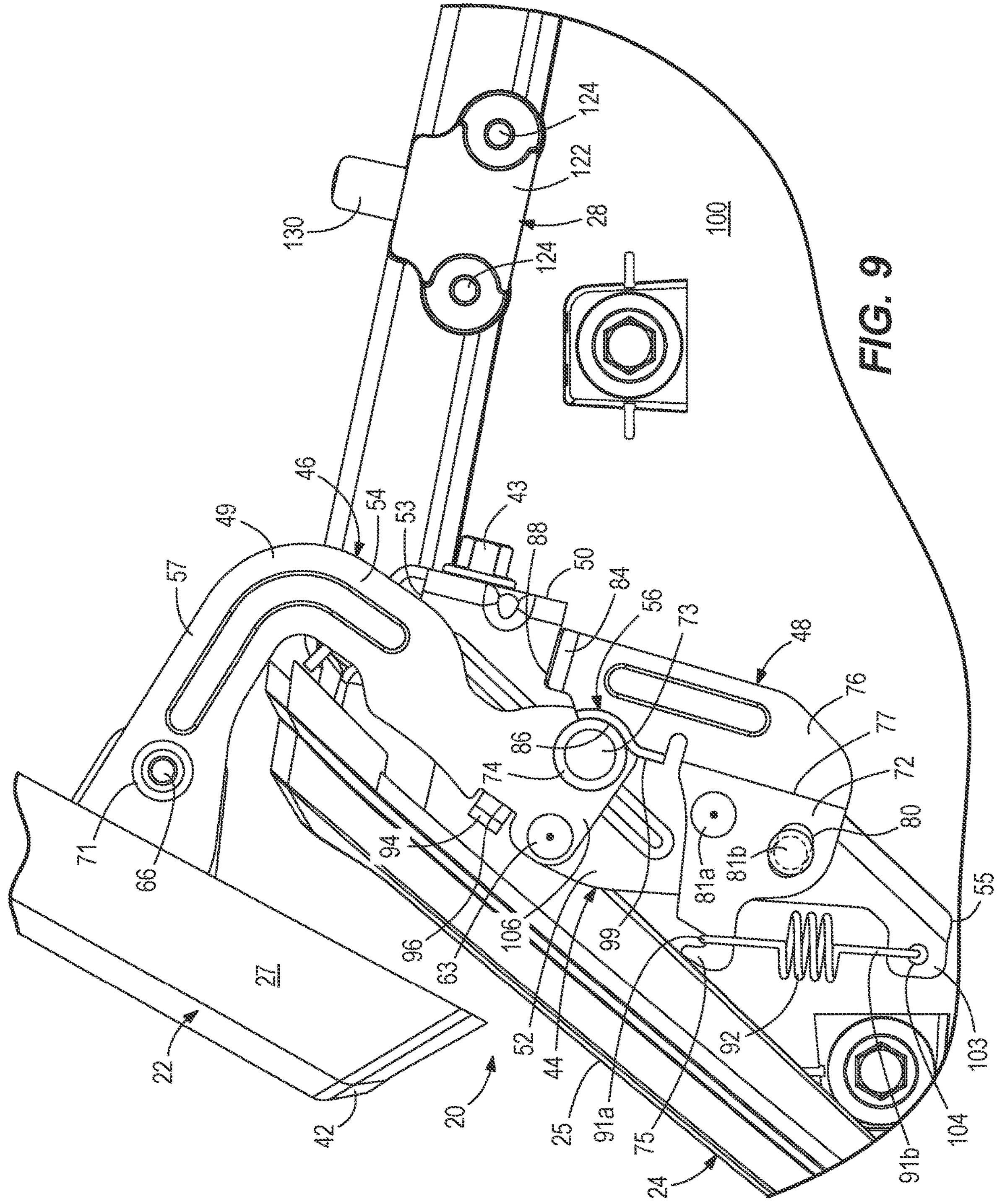
FIG. 9 is a partial interior view of the cowling illustrating the first cowl portion in an open cowl position.

Referring to FIGS. 7 and 8, as the user pivots the lid 22 into the open cowl position, the hinge bracket 46 is pivoted about the hinge axis 200, past the turned out flange 84 of the pivot bracket 48. The roller 74 engages (FIG. 7) and then rolls along (FIG. 8) the engagement surface 99 of the elongated shoulder 56, and toward the saddle 86. Engagement between the roller 74 and the engagement surface 99 causes the pivot bracket 48 to slightly pivot about the pivot axis 202, clockwise in the figures, and extends the coil spring 92 (see FIG. 8). In some embodiments, pivoting of the pivot bracket 48 brings the foremost end of the elongated hole 80 into engagement with the rivet 81*b* which prevents further pivoting of the pivot bracket 48. Some embodiments, however, may be configured such that the foremost end of the elongated hole 80 does not make contact with the rivet 81*b* as the user pivots the lid 22 into the open cowl position. For example, some embodiments may include a different component or components that prevent over rotation of the pivot bracket 48.

As shown in FIG. 9, once the lid 22 is moved into the open cowl position, the roller 74 rolls into a seated position in the saddle 86. Seating of the roller 74 in the saddle 86 allows the natural retraction bias of the coil spring 92 to pivot the pivot bracket 48 back into the position shown, which brings the foremost end of the hole 80 into engaged with the rivet 81*b*, preventing further pivoting of the pivot bracket 48. The bias of the coil spring 92 provides a forceful engagement between the saddle 86 and the roller 74, which thereby advantageously securely but removably retains the lid 22 in the open cowl position.

In the event that the user attempts to further pivot the lid 22 past the open cowl position, the angled flange 94 of the base bracket 44 engages with the cutout 96 of the hinge bracket 46, thus preventing overstroke of the hinge bracket 46. As such the angled flange 94 and cutout 96 provide stop surfaces preventing pivoting of the lid 22 past the open cowl position.

To move the lid 22 from the open cowl position back to the closed cowl position, the user manually pivots the lid 22 downward. Applying a manual downward force on the lid 22 pivots the hinge bracket 46 about the hinge axis 200, clockwise in the figures, which overcomes the bias of (i.e., extends) coil spring 92 as the roller 74 is disengaged from the saddle 86 and caused to roll along the engagement surface 99 until it completely separates from the elongated shoulder 56, as shown in FIGS. 5-6. The flange 84 helps funnel the hinge bracket 46 into axial position between the base bracket 44 and the pivot bracket 48 and prevents misalignment thereof. As the lid 22 is pivoted downwardly into the closed cowl position, the spring strength of the pop-up devices 28 are overcome by the user manually pushing down on the lid 22, as the latch device 41 is forced into the latched position.

More specifically, as the lid 22 is manually pushed into the closed cowl position, the latch engagement arm 230 is brought down onto the latch lever 238 and the angled engagement surface 254 engages and slides along the beveled engagement surface 256. This causes the latch lever 238 to pivot about the latch pivot axis 204, counterclockwise when viewed from above, forcing the end cap 252 into the spring cavity 250 and compressing the spring 248. Once the angled engagement surface 254 passes by the beveled engagement surface 256, the resiliency of the spring 248 moves the end cap 252 back outwardly in the spring cavity 250, which pivots the latch lever 238 back clockwise about the latch pivot axis 204 and causes the lever body 244 to engage with an engagement recess 258 in the latch engagement arm 230. Engagement of the lever body 244 in the engagement recess 258 retains the lid 22 in the closed cowl position.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A cowling for a marine drive, the cowling comprising:

a first cowl portion;

a second cowl portion; and a hinge device coupling the first cowl portion to the second cowl portion, wherein the first cowl portion is pivotable relative to the second cowl portion into an open cowl position exposing a cowling interior and a closed cowl position enclosing the cowling interior;

wherein the hinge device comprises a hinge bracket, a base bracket, and a detent mechanism including a roller configured to engage a saddle to retain the first cowl portion in the open cowl position.

2. A cowling for a marine drive, the cowling comprising:
a first cowl portion;
a second cowl portion;
a hinge device coupling the first cowl portion to the second cowl portion, wherein the first cowl portion is pivotable relative to the second cowl portion into an open cowl position exposing a cowling interior and a closed cowl position enclosing the cowling interior;
a latch device that is movable into a latched position retaining the first cowl portion in the closed cowl position and an unlatched position permitting pivoting of the first cowl portion out of the closed cowl position;
a detent mechanism configured to retain the first cowl portion in the open cowl position; and
a pop-up device configured to push the first cowl portion out of the closed cowl position when the latch device is unlatched so as to permit the first cowl portion to be pivoted into the open cowl position.

3. The cowling according to claim 2, wherein the pop-up device includes a spring having a spring strength that is strong enough to pivot the first cowl portion.

4. A cowling for a marine drive, the cowling comprising:
a first cowl portion;
a second cowl portion; and
a hinge device coupling the first cowl portion to the second cowl portion, wherein the first cowl portion is pivotable relative to the second cowl portion into an open cowl position exposing a cowling interior and a closed cowl position enclosing the cowling interior;
wherein the hinge device comprises a hinge bracket, a base bracket, and a detent mechanism configured to retain the first cowl portion in the open cowl position, the detent mechanism including a pivot bracket that is pivotable relative to the base bracket into an open bracket position and a closed bracket position.

5. The cowling according to claim 4, further comprising a latch device that is movable into a latched position retaining the first cowl portion in the closed cowl position and an unlatched position permitting pivoting of the first cowl portion out of the closed cowl position.

6. The cowling according to claim 4, wherein the pivot bracket is spring biased into the closed bracket position.

7. The cowling according to claim 6, wherein the detent mechanism includes a spring that applies the spring bias.

8. The cowling according to claim 6, wherein the detent mechanism includes a roller on a first one of the hinge bracket and the pivot bracket and a saddle on a different second one of the hinge bracket and the pivot bracket, the roller being configured to engage the saddle to retain the first cowl portion in the open cowl position.

9. The cowling according to claim 8, wherein the saddle is part of an elongated shoulder configured so that pivoting of the first cowl portion towards the open cowl position causes the roller to engage and ride along the elongated shoulder and then into the saddle once the first cowl portion reaches the open cowl position.

10. The cowling according to claim 8, wherein the roller is on the hinge bracket and the saddle is on the pivot bracket.

11. The cowling according to claim 8, wherein the base bracket comprises a stop surface which engages with a corresponding stop surface on the hinge bracket to prevent overstroke of the hinge bracket as the first cowl portion is pivoted into the open cowl position.

12. The cowling according to claim 11, wherein the stop surface on the base bracket comprises an angled flange and the stop surface on the hinge bracket comprises a cutout formed in a side of the hinge bracket.

13. The cowling according to claim 8, wherein the hinge bracket is disposed axially between the base bracket and the pivot bracket relative to a hinge axis.

14. The cowling according to claim 13, wherein the pivot bracket comprises a turned-out flange, and wherein pivoting the first cowl portion into the open cowl position pivots the hinge bracket past the turned-out flange, and wherein the turned-out flange is configured to funnel the hinge bracket into position between the base bracket and the pivot bracket when the first cowl portion is pivoted from the open cowl position towards the closed cowl position.

15. A hinge device for a cowling of a marine drive, the cowling including a first cowl portion and a second cowl portion, the hinge device comprising:
a hinge bracket;
a base bracket,
wherein the hinge bracket and base bracket are configured so that the first cowl portion is pivotable relative to the second cowl portion into and between an open cowl position exposing a cowling interior and a closed cowl position enclosing the cowling interior; and
a detent mechanism configured to retain the first cowl portion in the open cowl position, the detent mechanism comprising:
a pivot bracket that is pivotable relative to the base bracket into an open bracket position and a closed bracket position, wherein the pivot bracket is spring biased towards the closed bracket position; and
a roller on a first one of the hinge bracket and the pivot bracket and a saddle on a different second one of the hinge bracket and the pivot bracket, the roller being configured to engage the saddle to retain the first cowl portion in the open cowl position.

16. The hinge device according to claim 15, wherein the saddle is part of an elongated shoulder configured so that pivoting of the first cowl portion towards the open cowl position causes the roller to engage and ride along the elongated shoulder and then into the saddle once the first cowl portion reaches the open cowl position.

17. The hinge device according to claim 16, wherein the hinge bracket is disposed between the base bracket and the pivot bracket relative to a hinge axis.

18. The hinge device according to claim 17, wherein the pivot bracket comprises a turned-out flange, and wherein pivoting the first cowl portion into the open cowl position pivots the hinge bracket past the turned-out flange, and wherein the turned-out flange is configured to funnel the hinge bracket into position between the base bracket and the pivot bracket when the first cowl portion is pivoted from the open cowl position towards the closed cowl position.

19. The cowling according to claim 2, wherein the pop-up device is one of a pair of pop-up devices disposed on opposite sides of the cowling.

20. The cowling according to claim 2, wherein the pop-up device comprises a spring retainer having a spring cavity that retains a compression spring configured to push the first cowl portion out of the closed cowl position.

* * * * *